(12) United States Patent
Deleval

(10) Patent No.: US 11,772,740 B2
(45) Date of Patent: Oct. 3, 2023

(54) POWER TRAIN FOR A PEDAL VEHICLE

(71) Applicant: E2 DRIVES SA, Genval (BE)

(72) Inventor: Arthur Deleval, Overijse (BE)

(73) Assignee: E2 DRIVES SA, Genval (BE)

( * ) Notice: Subject to any disclaimer, the term of this patent is extended or adjusted under 35 U.S.C. 154(b) by 47 days.

(21) Appl. No.: 16/976,580

(22) PCT Filed: Feb. 26, 2019

(86) PCT No.: PCT/EP2019/054671
§ 371 (c)(1),
(2) Date: Aug. 28, 2020

(87) PCT Pub. No.: WO2019/166402
PCT Pub. Date: Sep. 6, 2019

(65) Prior Publication Data
US 2021/0046998 A1    Feb. 18, 2021

(30) Foreign Application Priority Data
Mar. 2, 2018    (BE) ................................. 2018/5128

(51) Int. Cl.
*B62M 6/55*    (2010.01)
*B62M 11/14*    (2006.01)
(Continued)

(52) U.S. Cl.
CPC ............... *B62M 6/55* (2013.01); *B60L 50/20* (2019.02); *B62M 6/70* (2013.01); *B62M 11/145* (2013.01); *F16H 3/727* (2013.01); *B60L 2200/12* (2013.01)

(58) Field of Classification Search
CPC . B62M 6/40; B62M 6/45; B62M 6/55; B62M 23/02; B62M 11/14; B62M 11/145; B60L 50/20
(Continued)

(56) References Cited

U.S. PATENT DOCUMENTS 5,865,267 A * 2/1999 Mayer ...................... B62M 6/60
180/206.5
9,908,588 B2 * 3/2018 Kuehlcke ................. B62M 6/55
(Continued)

FOREIGN PATENT DOCUMENTS

| EP | 2218634 A1 | 8/2010 |
| JP | 2008-285069 A | 11/2008 |
| WO | 2016034574 A1 | 3/2016 |

OTHER PUBLICATIONS

International Search Report dated May 6, 2019, issued in corresponding International Application No. PCT/EP2019/054671, filed Feb. 26, 2019, 5 pages.
(Continued)

*Primary Examiner* — Anne Marie M Boehler
(74) *Attorney, Agent, or Firm* — Christensen O'Connor Johnson Kindness PLLC

(57) ABSTRACT

A power train of a pedal vehicle includes a crankset axle and a first output plate having a first axis of rotation. The first output plate is coupled with a transmission chain or belt so as to drive the rear wheel of the pedal vehicle. The coupling between the crankset axle and the transmission chain or belt extends through a planetary gear train which rotates about a second axis of rotation. The crankset axle is further coupled to the first output plate by a first free wheel (16) which is arranged to prevent the first output plate from rotating slower than the crankset axle when the crankset axle rotates in the normal pedalling direction.

21 Claims, 4 Drawing Sheets

(51) Int. Cl.
 *F16H 3/72* (2006.01)
 *B60L 50/20* (2019.01)
 *B62M 6/70* (2010.01)

(58) Field of Classification Search
 USPC .............................................. 180/206.4, 69.6
 See application file for complete search history.

(56) References Cited

U.S. PATENT DOCUMENTS

| | | |
|---|---|---|
| 2017/0137086 A1 | 5/2017 | Yamamoto |
| 2017/0217537 A1 | 8/2017 | Yamamoto |
| 2017/0217538 A1 | 8/2017 | Yamamoto |
| 2019/0127024 A1* | 5/2019 | Hoppach ................ B62M 11/14 |

OTHER PUBLICATIONS

Written Opinion of the International Searching Authority dated May 6, 2019, issued in corresponding International Application No. PCT/EP2019/054671, filed Feb. 26, 2019, 6 pages.

\* cited by examiner

POWER TRAIN FOR A PEDAL VEHICLE

TECHNICAL FIELD

The present invention relates to a power train for a pedal vehicle.

BACKGROUND

The document JP2008-285069A discloses a power train for a pedal vehicle comprising a crankset. The power train comprises a first and second motor, an output plate, a crankset axle and a planetary gear train. The first motor is connected to a sun gear of the planetary gear train. The second motor is connected to an output element of the planetary gear train. The crankset axle is connected to an input element of the planetary gear train. The first motor, the output plate, the crankset axle and the planetary gear train rotate about the same axis of rotation. This power train further comprises a free wheel that connects the input element to the crankset axle. The output plate drives a chain that drives the rear wheel, allowing the pedal vehicle to move forward.

In this known power train, if the motors are not powered, the coupling is no longer done between the crankset axle and the output plate, thus preventing the bicycle from moving forward while pedalling. In the event of a failure of the electrical or electronic circuit, the cyclist will no longer be able to pedal the bike forward to return home. In addition, in the case of starting or uphill riding, the torque provided by the cyclist is high and may cause the transmission to slip, resulting in an unpleasant riding sensation. In addition, when riding at low speed in unassisted mode or if the battery is empty, one of the two motors will have to run as a generator to power the other motor. A significant portion of the power coming from the cyclist will pass through this low efficiency power path making pedalling particularly difficult.

SUMMARY OF THE INVENTION

A first object of the present invention is to provide a power train capable of providing good efficiency under all operating conditions, even without power supply. A second object of the present invention is to provide a power train whose transmission does not slip, thus making driving more pleasant.

For this purpose, the invention provides a power train for a pedal vehicle comprising:
  a crankset axle arranged to rotate about a first axis of rotation,
  a first output plate meshed on an output transmission chain or belt and arranged to rotate about the first axis of rotation,
  a planetary gear train comprising an input element, an output element and a sun gear,
  a first motor,
  a second motor,
  a first free wheel, and
  a reduction device between the output element of the planetary gear train and the first output plate,
  the crankset axle being connected to the planetary gear train via the input element so as to form a first input of the planetary gear train,
  the first motor being connected to the planetary gear train via the sun gear so as to form a second input of the planetary gear train,
  the second motor is connected to the output element of the planetary gear train so as to drive it in a fixed ratio,
characterized in that
  the input element, the output element and the sun gear are arranged to rotate about a second axis of rotation different from the first axis of rotation, and
  the first free wheel is arranged to prevent the first output plate from rotating slower than the crankset axle when the crankset axle rotates in the normal pedalling direction.

The arrangement of the first free wheel, arranged to prevent the first output plate from rotating slower than the crankset axle in the normal pedalling direction, causes the crankset axle to drive the first output plate when the rotational speed of the axle of the crankset exceeds that of the first output plate. This allows the crankset to drive the first output plate when the battery is empty, the motors are not running, or the cyclist's torque is excessive. There is then a purely mechanical drive with no slippage between the crankset axle and the first output plate, which reduces power losses and thus allows high mechanical efficiency. In addition, this reduces the stress on the planetary gear train and other power train transmission parts in the event of high crankset torque.

A further advantage of the arrangement of the first free wheel according to the invention is that, in the event of an electrical or electronic failure which makes it impossible to control the motors, the transmission of power from the crankset to the output plate will still be possible. The cyclist will therefore be able to pedal home.

In general, the power train according to the invention allows the transmission via the free wheel to take over from the transmission via the planetary gear train in certain specific situations. This occurs in particular when cyclist provides a large amount of torque in the crankset (for example, when starting or riding uphill) because of the latency time in the control of the first motor (the one connected to the sun gear) and the torque limits of the latter.

The first output plate may also transmit some power if the instantaneous torque on the crankset exceeds a certain threshold and the first motor saturates at its maximum torque. For the duration of this push on the pedal, the instantaneous value of the power train speed ratio decreases, and for example, if the programmed speed ratio is low, the first free wheel may start to operate and drive the first output plate, which then transmits the cyclist's excess torque to the output transmission chain or belt. When this happens, which can happen when the power assist is activated, the transmission chain receives torque from the output element of the planetary gear train and from the crankset axle. The presence of the first output plate and the first free wheel thus prevents the power train speed ratio from being less than one. The free wheel is therefore particularly useful on steep uphill roads to prevent the transmission from slipping.

The first free wheel is arranged to allow mechanical power transmission from the crankset axle to the first output plate. Preferably, the first free wheel is coaxial with the first axis of rotation. The first free wheel is preferably arranged directly between the crankset axle and the first output plate. In the locked position of the first free wheel, the crankset axle drives the first output plate directly. In the free position of the first free wheel, the first output plate can rotate faster than the crankset axle.

The first free wheel allows the speed ratio of the RVgmp power train to always be higher than 1.

The reduction device between the output element of the planetary gear train and the first output plate allows the first output plate to rotate slower than the output element of the planetary gear train. This reduction device may be partially outside the casing of the power train, particularly if it comprises a second output plate.

For the purpose of this document, the normal pedalling direction is the direction of rotation of the axle of the crankset which corresponds to a forward movement of the pedal vehicle. Because of the couplings in the power train, the elements of the power train preferably each have a direction of rotation which corresponds to this normal pedalling direction.

For the purpose of this document, two connected or linked elements may be connected or linked directly or indirectly. They may, for example, be directly or indirectly meshed via at least one intermediate gear wheel, belt and/or roller.

For the purposes of this document, the terms "input" and "output" shall be understood to mean input and output in a kinematic chain. An input is preferably a mechanical power input and an output is preferably a mechanical power output.

For the purpose of this document, the ratio of the planetary gear train is the reduction ratio of the planetary gear train. In the case of a planetary gear train with single planet gears, this is the ratio of the diameter of the ring gear to the diameter of the sun gear. The ratio of the planetary gear train here is preferably between five and ten.

For the purpose of this document, a pedal vehicle can be, for example, an electric bicycle, a moped or a tricycle. For the purpose of this document, a pedelec is an electric bicycle whose electric assistance must be switched off above a certain speed threshold of the bicycle.

For the purpose of this document, "the speed ratio of the power train" is defined as the ratio of the speed of the first output plate to the speed of the axle of the crankset. It may also be referred to as the "gear coefficient parameter" It is a parameter that can be controlled manually by the cyclist via a control interface or calculated automatically by a control unit based on other parameters.

For the purpose of this document, an element "arranged to rotate about an axis of rotation" is preferably an element that is essentially symmetrical about that axis.

For the purpose of this document, a "fixed ratio" between two objects means that the ratio of their rotational speeds is constant. For example, the rotor of the second motor drives the output element of the planetary gear train with a fixed ratio.

For the purpose of this document, the "the assistance ratio of the power train" AR refers to the portion of total power recovered at the output with respect to the power given by the cyclist. It can be calculated as the sum of the power from both motors and the cyclist's power divided by the cyclist's power. It can also be referred to as the "assistance ratio parameter". It is a parameter that can be controlled manually by the cyclist via a control interface or calculated automatically by the control unit based on other parameters.

For the purpose of this document, an angular position measurement is equivalent to an angular speed measurement. Indeed, the power train according to the invention preferably comprises a means for determining the angular speed of one of the motors from the angular position of this motor.

For the purpose of this document, a current measurement is equivalent to a torque measurement. Indeed, the power train according to the invention preferably comprises a means for determining the torque of one of the motors from the current supplied to this motor.

It is interesting to note that the power train has a mode of operation, which may be called "normal assisted operation mode", in which the first free wheel is non-blocking, which implies that all of the cyclist's power passes through the planetary gear train. This mode of operation is the one most often used by riders using an electric bicycle.

The first output plate is directly or indirectly meshed with the transmission chain or belt that drives, directly or indirectly, the rear wheel of the pedal vehicle.

The planetary gear train comprises a ring gear, a planet carrier and a sun gear. The planet carrier comprises planetary gears. The sun gear can also be called the inner sun gear or sun. The ring gear can also be called the outer sun gear. The sun gear and the ring gear are preferably connected via the planet gears.

Preferably, the power train comprises a control unit to control both motors.

In one embodiment of the invention, a role of the first motor is to control the speed ratio of the power train. The speed ratio of the power train RVgmp is the ratio between the angular speed of the axle of the crankset and the angular speed of the first output plate. For example, the speed ratio of the power train can be determined based on a Gear Coefficient (GC) parameter provided by the cyclist or determined by the control unit to provide an automatic speed change for the cyclist. This determination can for example be carried out by a gear shifting algorithm. The first motor is preferably controlled in angular position or angular speed, for example via the control unit which controls the first motor in such a way that a setpoint for angular position or angular speed is met.

In an embodiment of the invention, a role of the second motor is to manage the assistance ratio of the power train. One of its functions is to assist the movement of the cyclist by adding or subtracting the torque to or from the output element of the planetary gear train. Preferably, an assistance ratio, AR, is determined by the control unit based on, in particular, an assistance ratio parameter. The assistance ratio parameter can be determined by the user or in an automatic way by the control unit of the power train. It is preferred that the assistance ratio is independent of the speed ratio of the power train. The second motor is preferably controlled in current or torque, e.g. via the control unit which controls the second motor so that a current or torque setpoint is met.

Preferably, the control unit is electrically connected to a measuring element of an angular position of the first motor, a measuring element of an angular position of the second motor, a measuring element of a current of the first motor, and a measuring element of a current of the second motor.

It is interesting to note that there is no fundamental difference between position control and speed control because there is a direct mathematical relationship between the two values. The angular speed is the time derivative of angular position. For example, controlling a motor to run at a constant angular speed is like controlling a motor to follow an angular position that changes linearly with time.

Preferably, the input element is a planet carrier of the planetary gear train and the output element is a ring gear of the planetary gear train.

The control of the first and second motors can be carried out, for example, as follows.

The angular speed of the bicycle rear wheel $\omega_R$ is proportional to the angular speed of the first output plate $\omega_{plat}$:

$$\omega_R = R_R \cdot \omega_{plat}$$

With $R_R$ the transmission ratio between the angular speed of the rear wheel of the bicycle and the angular speed of the first output plate.

Using the speed equation of the planetary gear train, we can obtain the angular speed of the first output plate which is given by $$\omega_{plat} = \frac{1}{R_{out}} \left( \frac{R_C \cdot (R+1) \cdot \omega_{ped} - \omega_{M1}}{R} \right)$$

Where $R_{out}$ is the reduction ratio between the ring gear and the first output plate, $R_c$ is the gear ratio between the crankset axle and the planet carrier, $\omega_{M1}$ is the angular speed of the first motor, $\omega_{ped}$ is the angular speed of the crankset and R is the ratio of the planetary gear train.

This result indicates that the speed of the first output plate is a weighted sum of the speed of the crankset axle and that of the first motor. It also shows that it is possible to continuously change the speed ratio of the power train by varying the speed of the first motor.

The angular speed of the axle of the crankset can be determined from the measured angular speed of the first motor $\omega_{M1}^{mes}$ and of the second motor $\omega_{M2}^{mes}$ by $$\omega_{ped} = \frac{R \cdot \omega_{M2}^{mes}/R_{M2} + \omega_{M1}^{mes}}{(R+1) \cdot R_c}$$

Where $R_{M2}$ is the reduction ratio between the second motor and the ring gear. $R_{M2}$ is preferably between 5 and 15.

The angular speed of the crankset can also be measured by a position sensor measuring the position of the axle of the crankset.

The control unit can use a Gear Coefficient parameter GC and the measured angular speed of the crankset to determine the angular speed setpoint imposed to the first motor $\omega_{M1}^{cons}$ $$\omega_{M1}^{cons} = -GC \cdot Rc \cdot \omega_{ped}$$

The parameter GC can be either negative or positive. If the parameter GC is negative, the first motor operates as a generator to supply all or part of the power to the second motor. If the parameter GC is positive, the first motor operates as a motor.

It is also possible to control the first motor in angular position by assigning it an angular position setpoint which is simply the integral of this speed setpoint $\omega_{M1}^{cons}$.

Combining the above equations, we obtain the expression of the speed ratio of the power train RV gmp:

$$RVgmp = \frac{\omega_{plat}}{\omega_{ped}} = \frac{R_C}{R_{out}} \cdot \left( \frac{GC + R + 1}{R} \right)$$

This expression gives the link between the parameter GC and the speed ratio of the power train RV gmp. When GC is constant, the speed ratio of the power train is constant. The higher the parameter GC, the higher the speed ratio of the power train RV gmp.

When the first free wheel is blocking, the speed of the first output plate $\omega_{plat}$ is equal to the speed of the crankset $\omega_{ped}$, and the speed ratio of the power train RVgmp is 1. This is the minimum value of RVgmp. The smallest speed ratio parameter $GC_{min}$ of the power train is determined by the location of this free wheel and the dimensioning values $R_c$, $R_{out}$ and R. It then equals $$GC_{min} = \frac{R \cdot R_{out}}{R_c} - (R+1)$$

The power train according to the invention thus allows, depending on the choice of the values of $R_c$, $R_{out}$ and R, to obtain a negative $GC_{min}$, which allows the first motor to operate as a generator.

In an example of embodiment of the invention, R is equal to 8, $R_{out}$ is equal to 1.8 and $R_c$ is equal to 2.7.

The torque equation of the planetary gear train gives this expression:

$$C_{M1} = \frac{C_{cour}}{R} = \frac{C_{PS}}{(R+1)}$$

Where $C_{M1}$ is the torque of the first motor, $C_{cour}$ is the torque of the ring gear and $C_{PS}$ is the torque of the planet carrier.

The torque of the first motor $C_{M1}$ is therefore given by $$C_{M1} = \frac{C_{ped}}{R \cdot R_c} = \frac{C_{plat}}{(R+1) \cdot R_{out}}$$

Where $C_{ped}$ is the torque of the crankset and $C_{plat}$ is the torque of the first output plate.

So we have $$C_{ped} = (R+1) \cdot R_c \cdot C_{M1}$$

It is thus possible to calculate the torque of the $C_{ped}$ crankset from the torque measured on the first motor $C_{M1}$. Therefore, it is not necessary to use a torque sensor as is the case in other power trains for pedal vehicle.

We can consider an Assistance Ratio parameter (AR), for example equal to the ratio of the total power supplied to the wheel to the power supplied by the cyclist Pc. Therefore, for the power train to assist the cyclist, the parameter AR must be greater than 1. The parameter AR can, for example, be set to 1 when the cyclist decides to switch off his electric assistance.

$$AR = \frac{Pout}{Pc} = \frac{P_{M1} + P_{M2} + Pc}{Pc}$$

Taking into account that the power is equal to the torque multiplied by the angular speed, it is possible to determine the torque of the second motor that is adequate to reach the desired assistance ratio parameter, based on the torque of the first motor $C_{M1}$, by means of the equation $$AR = \frac{(GC+R+1)}{(R+1)} \cdot \left( 1 + \frac{R_{M2} \cdot C_{M2}}{R \cdot C_{M1}} \right) => C_{M2}^{cons} = C_{M1}^{mes} \cdot \frac{R}{R_{M2}} \cdot \left( \frac{AR \cdot (R+1)}{(GC+R+1)} - 1 \right)$$

$C_{M2}^{cons}$ is therefore a torque or current setpoint imposed on the second motor.

Depending on the values of AR and GC, the torque setpoint of the second motor will be either positive (motor operation) or negative (generator operation). For example, the torque setpoint of the second motor will be negative when the cyclist decides to pedal at more than 25 km/h if the power train is installed on a pedelec. Indeed, European law imposes a cut-off of the assistance beyond 25 km/h for this type of vehicle.

An equivalent development can be written for an embodiment of the invention where the input element is a ring gear of the planetary gear train and the output element is a planet carrier of the planetary gear train. The conclusions will be similar.

In an embodiment of the invention, the power train is arranged so as to satisfy the following inequality:

$$GC_{min} = \frac{R \cdot R_{out}}{R_c} - (R+1) < 0$$

where:
R is the ratio of the planetary gear train,
$R_{out}$ is the reduction ratio between the output element and the first output plate, and
$R_c$ is the gear ratio between the crankset axle and the input element.

This makes it possible to operate the first motor as a generator.

In one embodiment of the invention, at least one of the two motors is an inner permanent magnet motor.

An IPM motor is a motor in which the magnets are inside a ferromagnetic material. Such a motor typically has good efficiency over a wide range of rotational speeds, which allows it to be used, in particular as a second motor connected to the output, while maintaining a wide range of rotational speeds.

In an embodiment of the invention, the power train comprises a gearing down system between the crankset axle and the input element of the planetary gear train so that the input element rotates faster than the crankset axle.

In an embodiment of the invention, the gearing down system comprises a deformable transmission element, e.g. a gearing down belt, which is preferably notched.

In an embodiment of the invention, the reduction device between the output element of the planetary gear train and the first output plate comprises a second output plate meshed with the output transmission chain or belt.

Thus, the output element of the planetary gear train drives the second output plate which drives the output transmission chain or belt. The output transmission chain or belt drives the first output plate.

The second output plate drives, preferably directly, the output transmission chain or belt. This makes the power train particularly easy to assemble and makes it particularly light and compact. In addition, this reduces the number of parts and thus the manufacturing cost. It also makes it possible to achieve a particularly high power train transmission efficiency.

This second output plate is preferably integral with the output element of the planetary gear train. This second output plate has a smaller diameter than the one of the first output plate.

In an embodiment of the invention, the power train comprises a second free wheel arranged between the crankset axle and the input element of the planetary gear train so that the crankset axle drives the input element when the crankset axle rotates in the normal pedalling direction and so as to prevent the crankset axle from driving the input element when the crankset axle rotates in a direction opposite to the normal pedalling direction.

In an embodiment of the invention, the first motor is arranged to be controlled in speed or position and the second motor is arranged to be controlled in torque or current.

In an embodiment of the invention, the first motor is arranged to be controlled in speed or position by a speed setpoint which is determined on the basis of a measured speed of the input element of the planetary gear train and a Gear Coefficient parameter (GC) of the power train.

In an embodiment of the invention, the second motor is arranged to be controlled in torque or current by a torque setpoint determined on the basis of at least one torque or current measured on the first motor and an assistance ratio parameter (AR).

In an embodiment of the invention, the second motor is arranged to be controlled in torque or current by a torque setpoint which is proportional to the result of a filtering and/or a time shifting of a current measured on the first motor.

Indeed, instead of using the instantaneous measured current $C_{M1}^{mes}$, it may be preferable to use a signal filtered and/or shifted from the measured current $C_{M1}^{mes}$ in order to calculate the current setpoint $C_{M2}^{cons}$ of the second motor. This technique could, for example, be used when both motors are operating as a motor and one wants to smooth the assistance on one turn of the crankset, and thus also smooth the power coming from the battery.

In an embodiment of the invention, the first motor is arranged to be controlled in speed or position by a speed setpoint which is determined on the basis of a speed of the input element of the planetary gear train and this speed is determined on the basis of a measured speed of the first motor and a measured speed of the second motor.

In an embodiment of the invention, the power train is arranged so that at least one of the first and second motors can operate without the crankset axle being actuated.

This makes it possible to move the bicycle forward even when the crankset axle is stationary. This can be done, for example, by a control on the handlebars. In such a situation, there may be a motorization without pedalling, for example, at least the second motor can be operated. Preferably, in this situation, the first motor is not speed driven.

In an embodiment of the invention, the power train is arranged so that at least one of the two motors can operate as a generator by being driven by the output transmission chain or belt via the first output plate and the planetary gear train.

This allows the vehicle to be electromagnetically braked and the battery to be recharged. The control unit is preferably designed to control at least one of the two motors as a generator. The cyclist can indicate that he or she wants to apply this braking action with battery charging, for example via a control on the handlebars or via a back-pedal. Preferably in this situation, the first motor is not speed driven.

The invention further provides a system, e.g. a pedal vehicle, comprising a power train according to an embodiment of the invention and an output transmission chain or belt.

BRIEF DESCRIPTION OF THE FIGURES

Other characteristics and advantages of the invention will appear when reading the following detailed description, for the understanding of which reference should be made to the annexed figures, among which.

EMBODIMENTS OF THE INVENTION

The present invention is described with particular embodiments and references to figures, but the invention is not limited by them. The drawings or figures described are only schematic and are not limiting.

For the purpose of this document, the terms "first" and "second" serve only to differentiate between the different elements and do not imply any order between these elements.

In the figures, identical or similar elements may have the same references.

The description below presents four main embodiments of the invention which are purely illustrative, and the person skilled in the art will understand that there are many others. In each of the embodiments of the invention, the power train 1 comprises a crankset axle 2 and a first output plate 4 with the same axis of rotation and a planetary gear train comprising an input element, a sun gear 5 and an output element.

In a first embodiment of the invention (illustrated in FIG. 1), the crankset axle 2 is connected to the input element by a first gear which reverses the direction of rotation and the output element is connected to the first output plate by a reduction device comprising a second gear which also reverses the direction of rotation.

In a second embodiment of the invention (illustrated in FIG. 3), the crankset axle 2 is connected to the input element by a transmission system which retains the direction of rotation and the output element is connected to the first output plate by a reduction device comprising a second output plate which is integral with the output element and which also keeps the direction of rotation. This second output plate is meshed with the output transmission chain or belt.

In a third (non-illustrated) embodiment of the invention, the crankset axle 2 is connected to the input element by a first transmission system which retains the direction of rotation and the output element is connected to the first output plate by a belt which also retains the direction of rotation. Preferably, the power train according to this third embodiment of the invention does not comprise a second output plate.

In a fourth (non-illustrated) embodiment of the invention, the crankset axle 2 is connected to the input element by a first gear which reverses the direction of rotation and the output element is connected to the first output plate by a reduction device comprising a second gear which drives a second output plate and which also reverses the direction of rotation.

It is interesting to note that each embodiment of the invention is possible by considering that the input element is the planet carrier and the output element is the ring gear, or by considering that the input element is the ring gear and the output element is the planet carrier.

Figure 1:
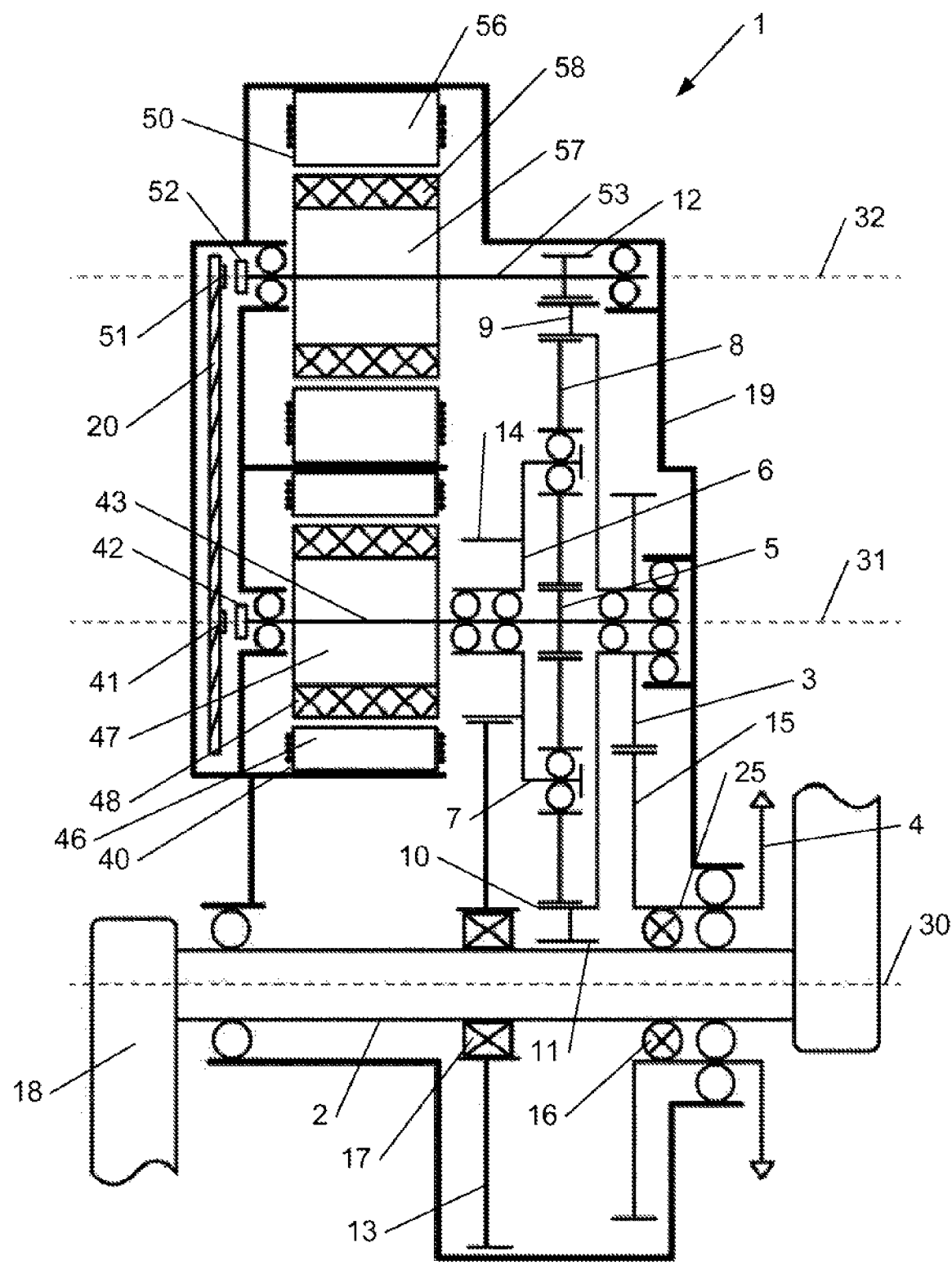
FIG. 1 illustrates a schematic section of a possible power train according to a first embodiment of the invention.

FIG. 1 shows a power train 1 which is possible according to a first embodiment of the invention. The power train 1 comprises a crankset axle 2 and a first output plate 4 with the same axis of rotation. This axle can be called first axis of rotation 30. The first output plate 4 is attached integrally to a hollow shaft 25, which is bearing-mounted on the crankset axle 2. Preferably, the crankset axle 2 is fixed to two cranks 18. Preferably, the power train 1 comprises a casing 19.

A first free wheel 16 is placed between the crankset axle 2 and the hollow shaft 25 so as to prevent the first output plate 4 from rotating slower than the crankset axle 2 when the crankset axle 2 is actuated in the normal pedalling direction (so as to move the bicycle forward). The first output plate 4 is therefore free to rotate faster than the crankset axle 2 in the normal pedalling direction.

The power train 1 comprises a planetary gear train arranged to rotate around a second axis of rotation 31. The planetary gear train comprises a sun gear 5, a planet carrier 6 and a ring gear 9. The planet carrier 6 comprises at least one planet gear 8. The planet gear(s) 8 is (are) arranged to rotate about axles 7 of the planet carrier 6. The planet gear(s) 8 is (are) in mesh with the sun gear 5 on the one hand and the ring gear 9 on the other hand.

The ring gear 9 preferably comprises internal toothing 10 meshed with the planet gear(s) 8. The ring gear 9 also comprises external toothing 11 meshed with the pinion 12 of the second motor 50.

The power train 1 comprises a first motor 40 and a second motor 50. The first motor 40 comprises a stator 46 and a rotor 47 which preferably comprises magnets 48. The rotor 47 is arranged to rotate about the second axis of rotation 31. The torque of the rotor 47 is transmitted by a shaft 43 of the rotor 47 to the sun gear 5. The second motor 50 comprises a stator 56 and a rotor 57 which preferably comprises magnets 58. The rotor 57 is arranged to rotate about a third axis of rotation 32. The torque of the rotor 57 is preferentially transmitted through a shaft 53 of the rotor 57 to a pinion 12.

Preferably, a first measuring magnet 42 is attached to one end of the shaft 43 of the first motor 40 and a second measuring magnet 52 is attached to one end of the shaft 53 of the second motor 50.

The power unit 1 preferably comprises a control unit, preferably a microcontroller. For example, the power train 1 may comprise an electronic board 20, connected to the first motor 40 and the second motor 50 and containing the control unit (not shown in the figures).

The power train 1 preferably comprises a current sensing element of the first motor 40 and a current measurement element of the second motor 50.

Preferably, a first sensor 41 is attached to the electronic board 20, approximately in the axis of the second axis of rotation 31. The first sensor 41 and the first measuring magnet 42 are part of an angular position measuring element of the rotor 47 of the first motor 40.

Preferably, a second sensor 51 is attached to the printed circuit board 20, approximately in the axis of the third axis of rotation 32. The second sensor 51 and the second measuring magnet 52 are part of an angular position measuring element of the rotor 57 of the second motor 50.

The pinion 12 is preferably connected to the rotor 57 of the second motor 50, so that it rotates with this rotor 57. The pinion 12 is preferably directly meshed with an external toothing 11 of the ring gear 9. The pinion 12 has a smaller diameter than the ring gear 9, the aim being to reduce the speed of rotation with respect to that of the motor.

Preferably, the sun gear 5 is integral with the rotor 47 of the first motor 40 so as to rotate with this rotor 47.

Preferably, the power train 1 comprises a gearing down system between the crankset axle 2 and the input element of the planetary gear train. This gearing down system may, for example, comprise a first input wheel 13 driven by the crankset axle 2 when the crankset axle 2 is actuated in its normal pedalling direction. The first input wheel 13 drives a second input wheel 14. The second input wheel 14 drives the planet carrier 6, which is the input element of the planetary gear train in the embodiment of the invention illustrated in FIG. 1. The first input wheel 13 is preferably integral with the crankset axle 2 or connected to the crankset axle by means of an optional second free wheel 17. The second input wheel 14 is preferably integral with the planet carrier 6. The first input wheel 13 has a larger diameter than the second input wheel 14.

The presence of the second free wheel 17 allows more flexibility in controlling the power train 1 because it allows the second motor 50 to rotate in its normal direction of operation without operating the crankset axle 2. This makes it possible, for example, to use the motorization by powering at least one of the two motors 40, 50, using a control on the handlebars for example, without the cyclist operating the crankset. In this way, the pedal vehicle can move forward without rotation of the crankset axle 2. It is interesting to note that the motor control in this specific operating mode may be different from the motor control when the crankset axle 2 is actuated.

The power from the combination of the powers of the first motor 40, the second motor 50 and the rider is preferably transferred to the first output plate 4 via a speed reduction device. The reduction device shown in FIG. 1 comprises a first output wheel 3, which is integral with the ring gear 9, and a second output wheel 15. The first output wheel 3 drives the second output wheel 15, which is integral with the hollow output shaft 25 and with the first output plate 4. The first output wheel 3 has a smaller diameter than the second output wheel 15.

FIG. 2 shows two graphs representing an example of the ratio of the power of the first motor to the power of the cyclist 62 versus the gear coefficient parameter GC 61. The speed ratio range of the power train is the same for these two graphs. The speed ratio range can be defined as the ratio of the maximum speed ratio of the power train to the minimum speed ratio of the power train.

Figure 2A:
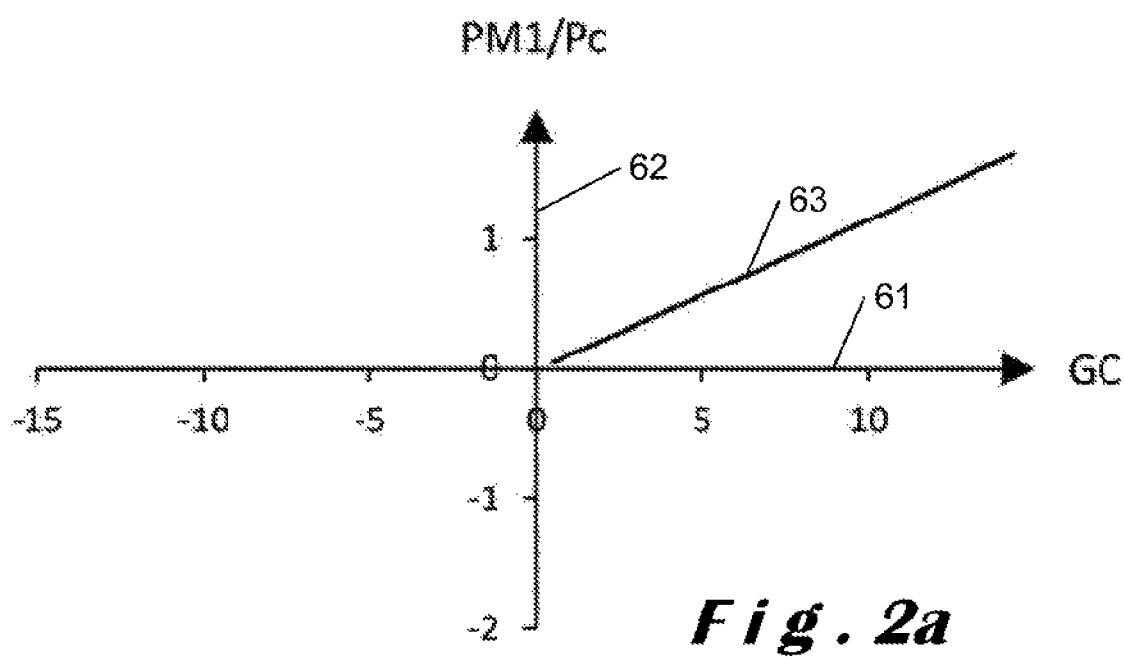
FIG. 2 shows two graphs representing examples of the ratio of the power of the first motor to the cyclist's power versus the gear coefficient parameter GC.

FIG. 2*a* is an example of such a graph 63 in an embodiment of the power train according to the invention where the ratio of the planetary gear train, the reduction ratio between the output element and the first output plate 4 and the gear ratio between the crankset axle 2 and the input element are selected such that $GC_{min}$ is positive:

$$GC_{min} = \frac{R \cdot R_{out}}{R_c} - (R+1) \geq 0$$

In this case, the first motor 40 rotates only in the direction of rotation corresponding to a motor operation, i.e. with a GC that can operate in the positive range.

Figure 2B:
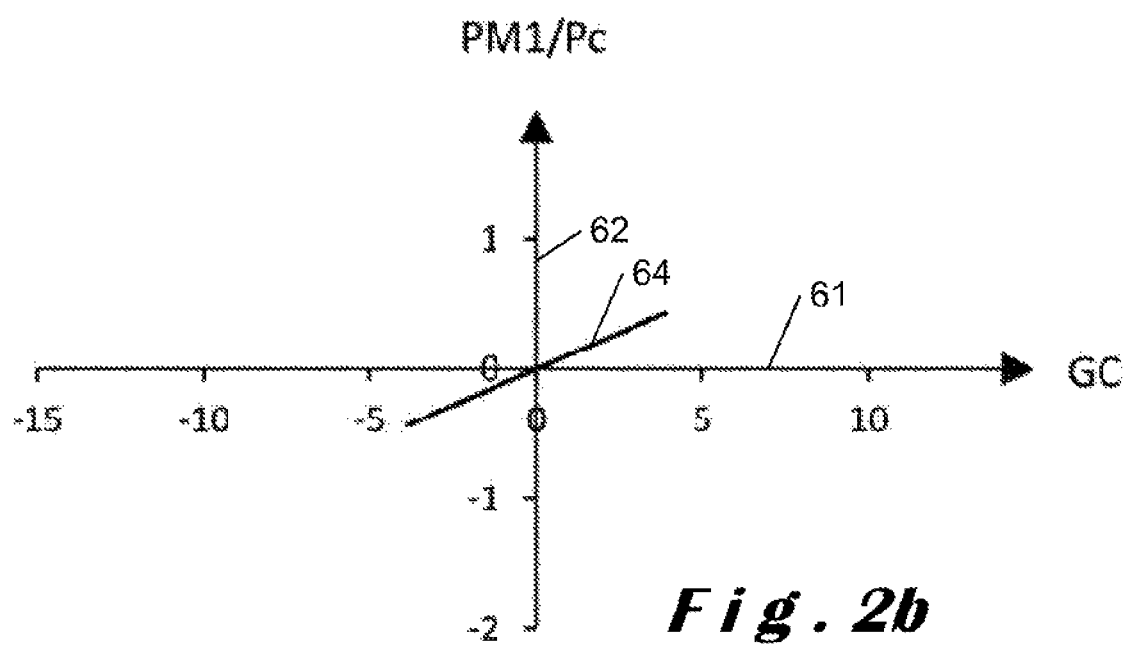

FIG. 2*b* is an example of such a graph 64 in an embodiment of the power train according to the invention where the ratio of the planetary gear train, the reduction ratio between the output element and the first output plate 4 and the gear ratio between the crankset axle 2 and the input element are chosen such that $GC_{min}$ is negative:

$$GC_{min} = \frac{R \cdot R_{out}}{R_c} - (R+1) < 0$$

In this case, the first motor 40 can rotate in both directions of rotation, so that it can be operated as a motor or generator, i.e. with a GC that can operate in the negative and positive zone.

It should be noted that the ratio between the power supplied by the first motor and the power supplied by the $P_{M1}/P_c$ rider is independent of the assistance ratio AR. So when AR is 1 (AR=Pout/Pc), it means that the power at the output of the power train is equal to the power supplied by the cyclist, i.e. the cyclist is not assisted. In this case, the mechanical power supplied by one motor must be braked by the other motor. In this mode of operation, one motor operates as a generator to power the other motor. We can say that there is therefore a power transfer between the two motors. This unassisted mode, where AR is 1, is forced by the control unit beyond 25 km/h for pedelecs.

This operation causes significant losses which are equal to the product of the efficiency of the first motor by the efficiency of the second. It is therefore interesting to minimise the part of the power coming from the cyclist that follows this low efficiency power path (called "transfer power between motors"). This transfer power between motors is in fact equal to the ratio "$P_{M1}/P_c$", which is the ordinate of the graphs in FIG. 2. Thus, the amount of power transfer between motors will be lower in the case of FIG. 2*b*.

Therefore, the comparison between FIGS. 2*a* and 2*b* shows that the situation in FIG. 2*b* is better in terms of efficiency in the unassisted mode than the situation in FIG. 2*a*.

A reduction of the $P_{M1}/P_c$ ratio also has the advantage of being able to reduce the size of the first motor 40, and thus reducing the weight and size of the power train.

It is interesting to note that the possibility to run the first motor as a generator is related to the location of the first free wheel, as well as to the reduction device between the output element of the planetary gear train and the first output plate and to the offset between the first and second axis of rotation. This power train arrangement allows $R_{out}$ to be different from 1 and $R_C$ to be potentially different from 1, thus allowing any value of $GC_{min}$ to be negative while having a purely mechanical locking system of the smallest speed ratio of the power train.

Figure 3:
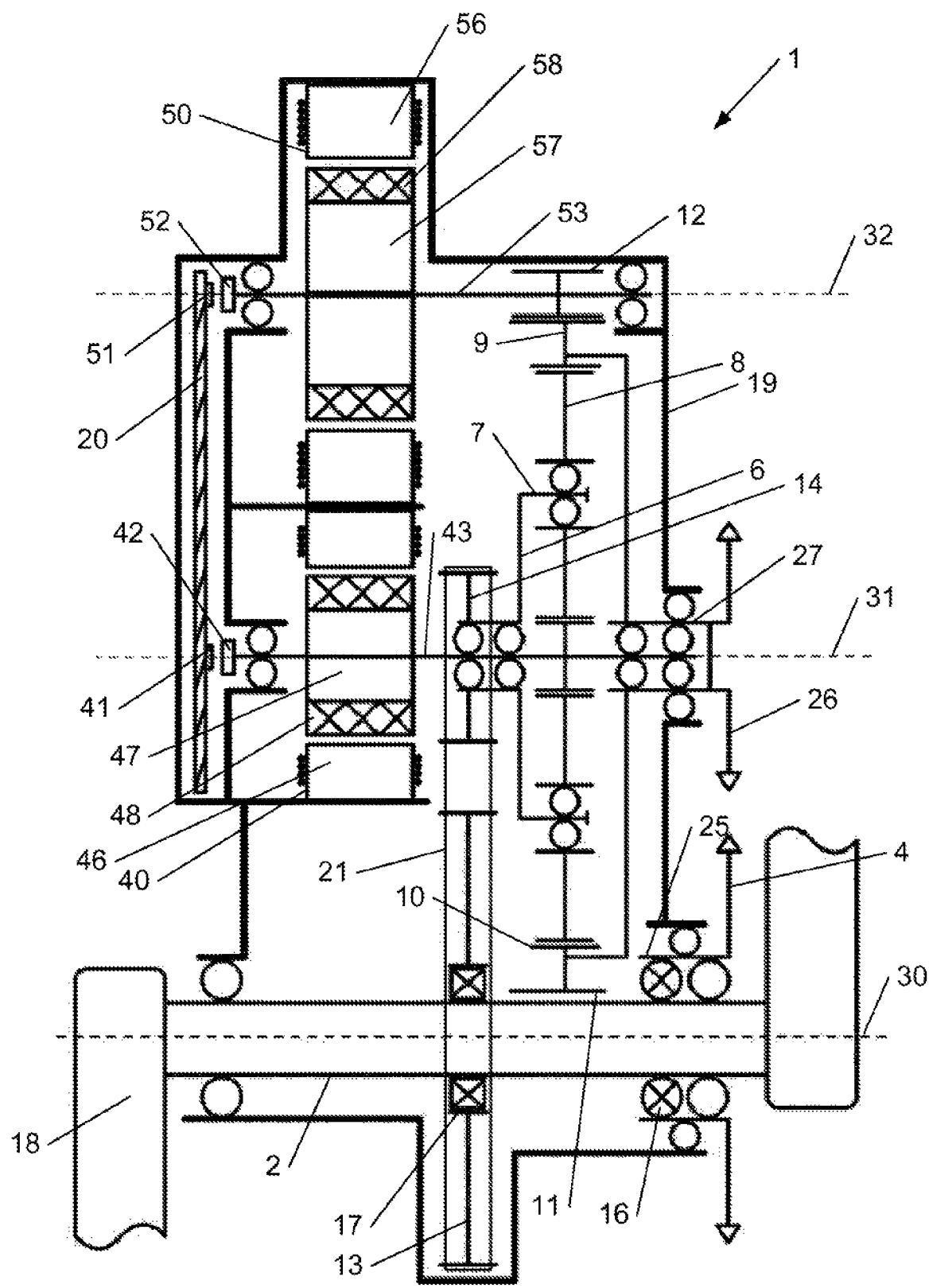
FIG. 3 illustrates a schematic section of a possible power train according to a second embodiment of the invention.

FIG. 3 illustrates a power train 1 according to a second embodiment of the invention. In the second embodiment of the invention, the transmission system between the crankset axle 2 and the input element of the planetary gear train keeps the direction of rotation. It preferably comprises a notched belt 21.

The transmission system keeping the direction of rotation can be, for example, a deformable transmission element, a double gear stage or a gear where one of the gear wheels has an internal toothing because, in each of these transmission systems, the direction of rotation of the input is identical to the direction of rotation of the output.

In contrast to the gear transmission, the transmission by means of a deformable transmission element leaves the choice of the centre distance between the rotating elements at its two ends. This gives a lot of design freedom. It also makes it possible to achieve a high gear ratio between the crankset axle and the first input of the planetary gear train without increasing the size of the system. This high gear ratio allows the planetary gear train to be undersized, which reduces the weight of the power train. It also reduces the size of the electric motors. This increases the gear ratio between the axle of the crankset and the first input element without increasing the size of the power train.

In addition, the use of a deformable transmission element to reduce the speed of the axle of the crankset to the first input of the planetary gear train results in a particularly large distance between the crankset axle and the axle of the planetary gear train. This makes it possible to increase the size of the ring gear of the planetary gear train to increase the ratio of it. The purpose of increasing the ratio of the planetary gear train is to increase the speed of both electric motors and thus reduce the size of these motors. This reduces the weight and volume of the power train. In this way, it is possible to reduce the diameter of the two electric motors, allowing both to be positioned on the same side of the power train.

The use of a belt transmission system makes it possible to isolate the crankset from vibrations that may be caused by the electric motors or the transmission. This dampens the vibrations felt by the cyclist's feet, thus improving comfort.

In the second embodiment of the invention, the power train 1 contains two output plates meshed on the same transmission chain or belt 23 to the rear wheel of the vehicle. The first output plate 4 is centred on the first axis of rotation 30 and a second plate 26 is centred on the second axis of rotation 31. The first free wheel 16 is placed between the crankset axle 2 and the first output plate 4 and prevents the latter from rotating slower than the crankset axle 2 when the crankset is operated in the normal pedalling direction.

The first output plate 4, rotating about a different axis than the second output plate 26, is used to guide the output transmission chain or belt around the axis of the axle of the crankset 2 in order to separate the lower and upper strands of the chain. Preferably, the first and second output plates are located outside a casing of the power train.

In normal assisted operation mode, the power train 1 according to the second embodiment of the invention can, for example, operate in the following way. The crankset axle 2 and the second motor 50 drive the planet carrier 6, with the drive between the crankset axle 2 and the planet carrier 6 passing through the notched belt 21. The planet carrier 6 is the input element of the planetary gear train. The first motor 40 drives the sun gear 5. The planet carrier 6 and the sun gear 5 drive the ring gear 9, which is the output element of the planetary gear train. The ring gear 9 drives the second output plate 26, which is itself meshed in the transmission chain (transmitting the power to the rear wheel of the vehicle). The rotational speed of the second output plate 26 will be equal to a weighted sum of the rotational speed of the planet carrier 6 and the rotational speed of the sun gear 5. By increasing the rotational speed of the sun gear 5, it is therefore possible to increase the speed of the second output plate 26, keeping a constant rotational speed at the crankset axle 2. It is therefore a continuously variable transmission (CVT).

The ring gear 9 is preferably mounted on a hollow shaft 27, which in turn is mounted on bearings around the axis of rotation 31. The hollow shaft 27 passes through the side wall of the casing 19, so that the second output plate 26, which is attached to the ring gear 9, is located outside the casing 19.

The first free wheel 16 prevents the first output plate 4 from rotating slower than the crankset axle 2 when the crankset axle 2 rotates in the normal pedalling direction. One purpose of this free wheel 16 is that the speed ratio of the power train should not be lower than 1. This location of the first free wheel 16 prevents high torque in the rest of the power train in case of high pedalling torque. Thus, certain parts of the power train are not subjected to this high torque. It is particularly interesting to preserve in particular this way the planetary gear train and the transmission system between the crankset axle 2 and the first input element of the planetary gear train when it comprises a deformable transmission element such as a belt 21. This is because notched belts do not support high torques.

The first free wheel 16 is arranged to allow direct mechanical power transmission from the crankset axle 2 to the first output plate 4. The first free wheel 16 is preferably arranged directly between the crankset axle 2 and the first output plate 4. In the locked position, the crankset axle 2 drives the first output plate 4 directly. In the free position, the first output plate 4 can rotate faster than the crankset axle 2.

In addition, the first free wheel allows that, under certain conditions, the crankset axle 2 directly drives the first output plate 4, which in turn drives the output transmission chain or belt that drives the rear wheel. All the pedalling power is then transmitted directly to the transmission chain or output belt via the first output plate 4. The rest of the transmission system, including the planetary gear train, is therefore unloaded, allowing high mechanical efficiency. This occurs, for example, if the electrical system of the power train is switched off or if the assistance is deactivated and the lowest speed ratio of the power train is selected.

The first output plate 4 can also transmit part of the power if the instantaneous torque on the crankset exceeds a certain threshold and the first motor 40 saturates at its maximum torque. For the duration of this pedal push, the instantaneous value of the speed ratio of the power train decreases, and for example, if the speed ratio set is low, the first free wheel 16 may engage and drive the first output plate 4 which then transmits the cyclist's excess torque to the output transmission chain or belt. When this happens, which can happen when the assistance is activated, the output transmission chain or belt receives power on the one hand via the planetary gear train and the second output plate 26 and on the other hand via the first output plate 4. The presence of the first output plate 4 and the first free wheel 16 thus prevents the speed ratio of the power train from being less than 1 and thus prevents the transmission from slipping, which is detrimental to the driving pleasure.

Figure 4:
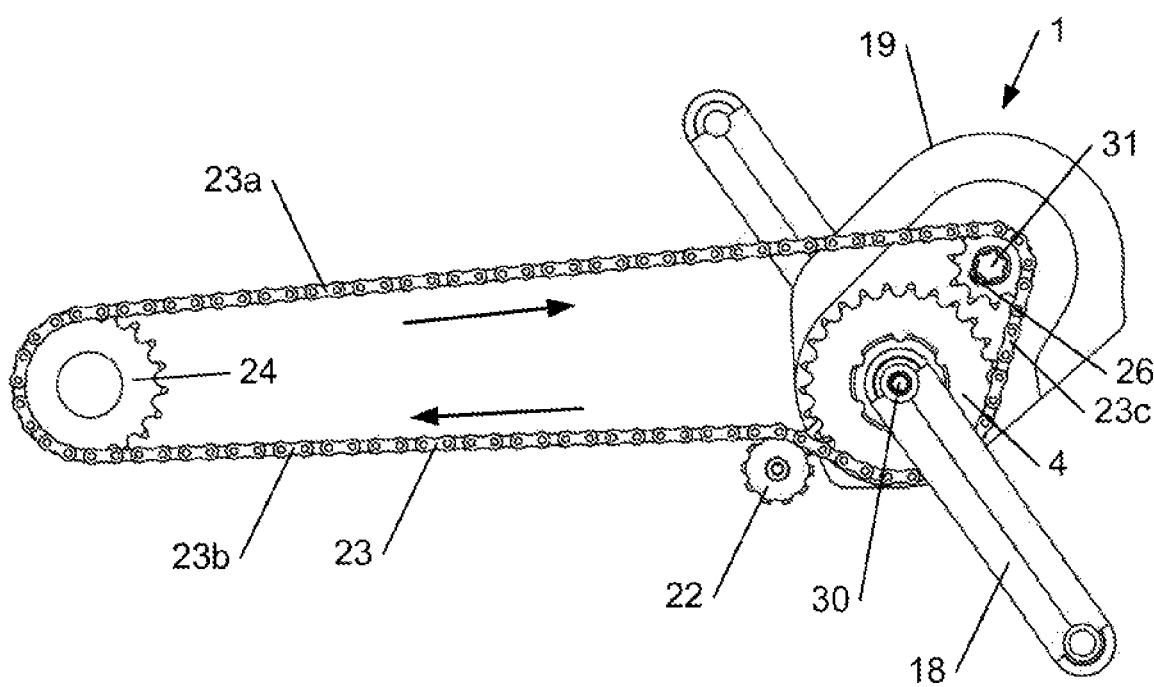
FIG. 4 shows a side view of a possible power train according to the second embodiment of the invention and the transmission to a rear wheel of the pedal vehicle.

FIG. 4 shows a side view of the power train according to the embodiment of the invention and the transmission to a rear wheel of the pedal vehicle. This may be, for example, the power train according to the second embodiment of the invention.

FIG. 4 shows a power train 1, an output transmission chain 23, a rear wheel pinion 24 and a tensioning roller 22. The output transmission chain 23 comprises an upper strand 23a, a lower strand 23b and an intermediate strand 23c. The intermediate strand 23c is the part of the output transmission chain 23 located between the second output plate 26 and the first output plate 4.

The function of the tensioning roller 22 is to take up the slack in the output transmission chain or belt 23 when the transmission is put under load. It keeps the intermediate strand 23c taut. This tensioning roller 22 can be integrated into the power train 1 or attached to the frame of the pedal vehicle. It is positioned so that it is in contact with the lower strand 23b. It is also possible to consider a stationary operation without tensioning roller 22.

In normal assisted operation mode of the power train 1 in the second embodiment, the second output plate 26 transmits the power to the vehicle wheel(s). The second output plate 26 drives the output transmission chain or belt 23. The first output plate 4, being meshed on the same transmission chain 23 as the second output plate 26, rotates idle at a higher speed than the crankset axle 2. The first output plate 4 is disengaged from the crankset axle 2 by means of the first free wheel 16. A first function of the first output plate 4 is to guide the transmission chain 23 around the axle of the crankset 2, thereby increasing the distance between the upper chain strand 23*a* and the lower chain strand 23*b*. In this way, there is sufficient space for the right rear base of the frame to pass through in case the propulsion system is installed on a bicycle frame. This right rear base is a tube of the frame connecting the attachment point of the rear wheel to a bracket of the power train. It is not shown in FIG. 4.

In some special operating modes, the first free wheel 16 locks and prevents the first output plate 4 from rotating slower than the axle of the crankset 2. In this case, the first output plate 4 drives, in whole or in part, the output transmission chain 23, and thus also the second output plate 26. If the electrical system is switched off and/or the assistance is deactivated and the lowest speed ratio of the power train 1 is selected (either by the user or by the control system), then all of the cyclict's power is transmitted to the transmission chain 23 via the first output plate 4. The rest of the transmission is therefore unloaded and the transmission is mechanically highly efficient.

The first output plate 4 can also transmit part of the power if the cyclist's instantaneous torque exceeds a certain threshold and the first motor reaches its maximum torque. For the duration of this pedal push, the instantaneous value of the speed ratio of the power train will decrease, and if the speed ratio set is low, the first free wheel 16 may activate and drive the first output plate 4 which will transmit the excess torque of the cyclist to the transmission chain 23. The interaction of the first output plate 4 and the first free wheel 16 prevents the speed ratio of the power train from reaching a value lower than 1.

In other words, the invention relates to a power train 1 for a pedal vehicle. The power train 1 comprises a crankset axle 2 and a first output plate 4 having a first axis of rotation 30. The first output plate 4 is coupled with a transmission chain or belt 23 so as to drive the rear wheel of the pedal vehicle. The coupling between the crankset axle 2 and the transmission chain or belt 23 is via a planetary gear train rotating about a second axis of rotation 31. The crankset axle 2 is further coupled to the first output plate 4 by a first free wheel 16 arranged to prevent the first output plate 4 from rotating slower than the crankset axle 2 when the crankset axle 2 rotates in the normal pedalling direction.

The present invention has been described in relation to specific embodiments, which are purely illustrative and should not be considered as limiting. In general, the present invention is not limited to the examples illustrated and/or described above. The use of the verbs "consist", "include", "comprise", or any other variant, as well as their conjugations, can in no way exclude the presence of elements other than those mentioned. The use of the indefinite article "an", "a" or the definite article "the", to introduce an element does not exclude the presence of a plurality of such elements. The reference numbers in the claims shall not limit their scope.

The invention claimed is:

1. A power train for a pedal vehicle, comprising:
a crankset axle arranged to rotate about a first axis of rotation;
a first output plate meshed on an output transmission chain or belt and arranged to rotate about the first axis of rotation;
a planetary gear train comprising an input element, an output element, and a sun gear;
a first motor;
a second motor;
a first free wheel having a locked position and a free position when the crankset axle rotates in a normal pedalling direction, wherein the first free wheel is arranged to transmit mechanical power to the first output plate; and
a reduction device between the output element of the planetary gear train and the first output plate,
wherein the crankset axle is connected to the planetary gear train via the input element so as to form a first input of the planetary gear train,
wherein the first motor is connected to the planetary gear train via the sun gear so as to form a second input of the planetary gear train,
wherein the second motor is connected to the output element of the planetary gear train so as to drive it in a fixed ratio,
wherein the input element, the output element and the sun gear are arranged to rotate about a second axis of rotation different from the first axis of rotation, and
wherein the first free wheel is arranged to prevent the first output plate from rotating slower than the crankset axle when the crankset axle rotates in a normal pedalling direction,
wherein when the first free wheel is in the locked position, the crankset axle drives the first output plate directly, and wherein when the first free wheel is in the free position, the first output plate is able to rotate faster than the crankset axle, and
wherein the power train is arranged so as to satisfy the expression of the speed ratio of the power train:

$$RVgmp = \frac{\omega_{plat}}{\omega_{ped}} = \frac{R_C}{R_{out}} \cdot \left(\frac{GC + R + 1}{R}\right)$$

where:
RVgmp is the speed ratio of the power train,
R is a ratio of the planetary gear train,
$R_{out}$ is a reduction ratio between the output element and the first output plate, and
$R_C$ is a gear ratio between the crankset axle and the input element,
$\omega_{ped}$ is the speed of the crankset,
$\omega_{plat}$ is the speed of the first output plate,
GC is a gear coefficient parameter of the power train linking the speed of the first motor to the speed of the crankset according to the expression $\omega_{M1}^{cons}=-GC \cdot Rc \cdot \omega_{ped}$
and arranged so as, when the first free wheel is in a blocked position, the speed of the first output plate $\omega_{plat}$ is equal to the speed of the crankset $\omega_{ped}$, and the speed ratio of the power train RVgmp equals 1 corresponding to the smallest gear coefficient parameter of the power train GC=$GC_{min}$ satisfying the expression $$GC_{min} = \frac{R \cdot R_{out}}{R_c} - (R+1) < 0$$

so that the first motor is able to operate as a generator.

2. The power train according to claim 1, wherein at least one of the first motor or the second motor is an inner permanent magnet motor.

3. The power train according to claim 1, further comprising a gearing down system between the crankset axle and the input element of the planetary gear train, wherein the gearing down system causes the input element to rotate faster than the crankset axle.

4. The power train according to claim 3, wherein the gearing down system comprises a deformable transmission element.

5. The power train according to claim 1, wherein the reduction device between the output element of the planetary gear train and the first output plate comprises a second output plate meshed with the output transmission chain or belt.

6. The power train according to claim 5, wherein the second output plate is integral with the output element of the planetary gear train.

7. The power train according to claim 5, wherein the second output plate has a smaller diameter than the first output plate.

8. The power train according to claim 1, further comprising a second free wheel arranged between the crankset axle and the input element of the planetary gear train so that the crankset axle drives the input element when the crankset axle rotates in the normal pedalling direction and so as to prevent the crankset axle from driving the input element when the crankset axle rotates in a direction opposite to the normal pedalling direction.

9. The power train according to 1, wherein the input element is a planet carrier of the planetary gear train and the output element is a ring gear of the planetary gear train.

10. The power train according to claim 1, wherein the input element is a ring gear of the planetary gear train and the output element is a planet carrier of the planetary gear train.

11. The power train according to claim 1, wherein the first motor is arranged to be controlled in speed or position and the second motor is arranged to be controlled in torque or current.

12. The power train according to 1, wherein the first motor is arranged to be controlled in speed or position by a speed setpoint which is based upon a measured speed of the input element of the planetary gear train and the gear coefficient parameter (GC) of the power train.

13. The power train according to claim 1, wherein the second motor is arranged to be controlled in torque or current by a torque setpoint based upon a torque or a current measured on the first motor and based upon an assistance ratio parameter (AR).

14. The power train according to claim 1, wherein the second motor is arranged to be controlled in torque or current by a torque setpoint which is proportional to a result of at least one of filtering or time shifting a current measured on the first motor.

15. The power train according to claim 1, arranged so that at least one of the first motor or the second motor is configured to operate without the crankset axle being actuated.

16. The power train according to claim 1, arranged so that at least one of the first motor or the second motor is configured to operate as a generator by being driven by the output transmission chain or belt via the first output plate and the planetary gear train.

17. A pedal vehicle comprising the power train according to claim 1 and the output transmission chain or belt.

18. The power train according to claim 1, further comprising the output transmission chain or belt.

19. The power train according to claim 1, wherein in a blocked position of the first free wheel, the first motor is able to operate as a generator.

20. The power train according to claim 1, wherein the first motor is configured to rotate in both directions of rotation when the crankset axle rotates in the normal pedaling direction.

21. A power train for a pedal vehicle, comprising:
a crankset axle arranged to rotate about a first axis of rotation;
a first output plate meshed on an output transmission chain or belt and arranged to rotate about the first axis of rotation;
a planetary gear train comprising an input element, an output element, and a sun gear;
a first motor;
a second motor;
a first free wheel having a locked position and a free position when the crankset axle rotates in a normal pedalling direction, wherein the first free wheel is arranged to transmit mechanical power to the first output plate; and
a reduction device between the output element of the planetary gear train and the first output plate,
wherein the crankset axle is connected to the planetary gear train via the input element so as to form a first input of the planetary gear train,
wherein the first motor is connected to the planetary gear train via the sun gear so as to form a second input of the planetary gear train,
wherein the second motor is connected to the output element of the planetary gear train so as to drive it in a fixed ratio,
wherein the input element, the output element and the sun gear are arranged to rotate about a second axis of rotation different from the first axis of rotation, and
wherein the first free wheel is arranged to prevent the first output plate from rotating slower than the crankset axle when the crankset axle rotates in a normal pedalling direction,
wherein when the first free wheel is in the locked position, the crankset axle drives the first output plate directly, and wherein when the first free wheel is in the free position, the first output plate is able to rotate faster than the crankset axle, and
wherein the first motor is arranged to be controlled in speed or position by a speed setpoint which is based upon a speed of the input element of the planetary gear train, wherein the speed of the input element is based upon a measured speed of the first motor and a measured speed of the second motor.

* * * * *